United States Patent Office 2,894,328
Patented July 14, 1959

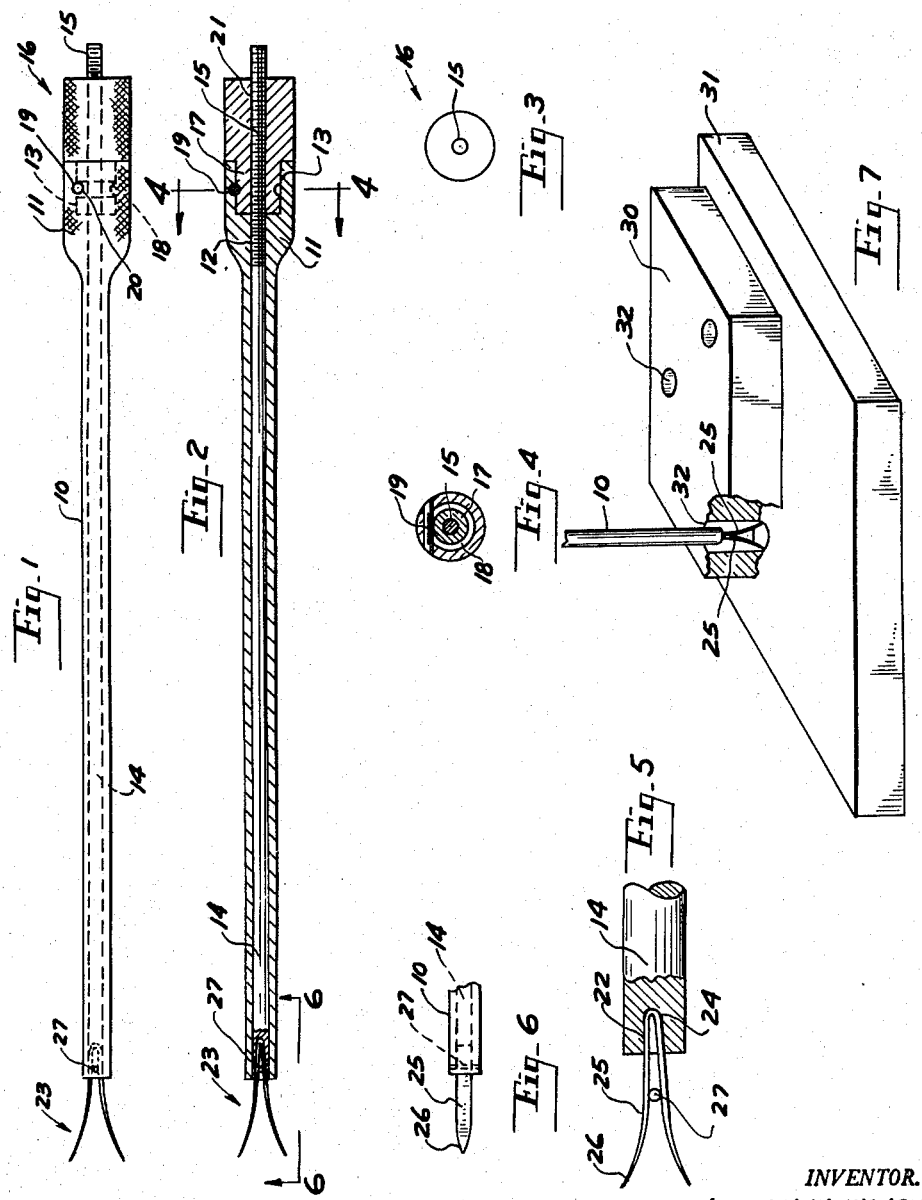

2,894,328

CIRCULAR SCRIBER

Joseph W. Wojcik, Detroit, Mich.

Application August 23, 1957, Serial No. 679,912

2 Claims. (Cl. 33—27)

My invention pertains to a novel scriber in which two pointed blades of equal length, adjustably spaced from each other, are adapted to be rotated about an imaginary axis passing through a point between the two points of the blades to describe a circle upon a given flat surface.

More specifically, my invention pertains to a scriber including a straight tubular member, a shaft axially disposed therein, and two resilient, flexible blades secured to one end of the shaft and partly located within one end of the tubular member, the outer end of each blade terminating with a sharp point, the other end of the tubular member being provided with means in engagement with the shaft for the purpose of moving the shaft axially within said tubular member.

The scriber includes means whereby the blades may be spread apart or caused to be drawn towards each other, depending upon the diameter of the circle which is to be cut by said points.

The invention is particularly adapted to be applied to use through a bore in an object resting upon a plate upon which a circular outline is to be made.

I shall now describe my invention with reference to the accompanying drawings in which:

Fig. 1 is a longitudinal elevational view of the scriber;

Fig. 2 is a longitudinal sectional view thereof;

Fig. 3 is an end view of the scriber at the end remote from the blades;

Fig. 4 is a sectional view on line 4—4 of Fig. 2;

Fig. 5 is an enlarged end view of a shaft within the tubular member of the scriber, the view disclosing two blades carried by said shaft and a pin designed to cause the spreading of said blades;

Fig. 6 is a side elevational view of the operative end of the scriber, the view disclosing a single blade;

Fig. 7 is a perspective view of two thick plates in which one is partly broken off, the view including a perspective view of the operative end of the scriber as applied through a bore in one of the plates against the flat surface under said plate.

Similar numerals refer to similar parts throughout the several views.

One element of the scriber consists of a straight, tubular member 10 which at one end includes a radially-expanded, thick-walled head 11. The head contains an axial bore 12 which is but a continuation of the cavity of said tubular member 10, and an axial socket 13 which opens outwardly, endwise of said head.

Axially disposed within said tubular member 10 is a shaft 14 which at one end passes axially through the bore 12 in the head 11, said end being threaded externally, as shown at 15. Axially engaged with said end 15 is a cylindrical knob 16 which includes a shank 17 fitting into said socket 13. The shank is provided with an annular groove 18. This serves for reception of a pin 19 which is disposed in a hole 20 extending through the head 11, tangentially with respect to the annular groove 18.

The knob 16, including the shank, contains an axial threaded bore 21, and it is through this bore that the end 15 of the shaft may extend outwardly, as shown in the drawings.

At the opposite end the shaft contains a diametrical slot 22, and secured therein is one end of a two-blade member generally marked 23. The member is made of a single strip of flat spring steel turned upon itself in a hairpin turn, as shown at 24, and includes two blades 25 which are in a yieldable opposed relation to each other. The blades are of the same length, each terminating with a sharp point 26. At that end of the tubular member 10 at which the shaft 14 contains said blades, said tubular member is provided with a pin 27 which is held diametrically with respect to said member 10 in the wall thereof and fits between the two blades 25, as shown in Figs. 2 and 5.

In case the blades are caused to be moved outwardly of the tubular member 10, they would be spread apart by the stationary pin 27 which, being located between said blades, would act like a wedge. Conversely, in a case when the shaft 14, which carries the blades, should be drawn back into the tubular member 10, the blades would be deflected towards each other by the inner surface of said tubular member 10.

The manner in which the scriber may be used will become obvious in the following illustration. It will be assumed that a plate 30 is to be secured to a base plate 31 by means of a plurality of bolts, each to fit through a respective hole 32 to a corresponding hole in the base. Since to start with the base has no holes, care must be had that the holes which have to be made be alined with the holes in said plate 30. Ordinarily a sharp, pointed punch would be inserted into a hole 30, whereupon by a blow of a hammer on top of the punch an indentation would be made in the base 31. However, a punch might be of different diameter than that of the hole 32, and it might not be held exactly centered in said hole. Thus, as a result thereof, the mark might not be in the center of a bore which would be accurately alined with the hole 32.

The use of the scriber would eliminate such disalinement. For that purpose the scriber would be inserted into a respective hole 32, but it might be necessary to first bring the blades towards each other to such an extent that the blades would enter the hole 32. This object of bringing the blades toward each other would be brought about by means of the knob 16. The knob, as already described, is seated axially upon the threaded end portion 15 of the shaft 14. When rotated, the knob would retain its position longitudinally with respect to the head of the tubular member 10 because of the pin 19 which would prevent such longitudinal movement, but it would be the shaft 14 which would be propelled axially within said member 10.

The blades, which are secured to the shaft, would move therewith out of the tubular member or into it, as the case might be.

Returning to the illustration named above, the knob would be rotated for the purpose of withdrawing the blades into the tubular member far enough to permit the insertion of the scriber, including the blades, into said hole 32, as shown in Fig. 7. Once the scriber has been thus inserted into the bore 32, the knob might be used again to re-adjust the spread of the blades to cause the blades to be in positive contact with the inner surface of the bore. In such an event the points of the blades would be spaced from each other substantially to the very diameter of the bore 32 itself. Now, by rotation of the scriber by means of the head 11, the blades would describe a circle on top of surface of base 31, cutting into said surface a visible circular mark. Each such mark would definitely determine the location of the bore to be made in base 31 for alinement with the respective bore 32, and would make it an easy matter both to locate the center of each bore to be made and to secure an accurate alinement of all the bores in the top plate 30 with the bores in the base plate 31.

It will be understood that some changes may be made in the structure of the scriber without departing beyond the inventive concept disclosed herein. So, for instance, the blades which are shown as elements of a single strip of spring steel might be made separately, that is, each blade could be made as a separate unit, but the blades would be held together in the same relation to each other as shown in the drawings.

What I wish to claim is as follows:

1. A circular scriber including a straight tubular member, a shaft axially disposed therein, a flat resilient member looped upon itself in a hairpin turn to form two blades, the member being axially secured at its looped portion to one end of the shaft, but being adapted to project outwardly from one end of the tubular member, the blades being of the same length, each terminating with a sharp point, a stationary pin held diametrically within said end of the tubular member and fitting between said blades, the opposite end of the shaft being threaded and extending outwardly of said tubular member, and a knob seated axially upon the threaded end of the shaft to propel said shaft axially to move the blades outwardly and to cause them to be spread apart by said stationary pin or to withdraw the blades towards the tube and to cause the blades to be deflected towards each other by the inner surface of the tubular member.

2. A circular scriber including a straight tubular housing, a shaft axially disposed therein and having in one end an axially disposed V-shaped slot flaring outwardly, a flat resilient member bent upon itself in a hair-pin turn, to form a looped portion and two blades, the blades being adapted to project outwardly from one end of the tubular housing, the blades being of the same length, each terminating with a sharp point, a stationary pin held diametrically within said end of the tubular member and fitting between said blades, the opposite end of the shaft being threaded and extending outwardly of said tubular member, and a knob seated axially upon the threaded end of the shaft to propel said shaft axially to move the blades outwardly and to cause them to be spread apart by said stationary pin or to withdraw the blades towards the tube end to cause the blades to be deflected towards each other by the inner surface of the tubular member.

References Cited in the file of this patent

UNITED STATES PATENTS

| 890,590 | Anderson | June 16, 1908 |
| 2,339,720 | Smith | Jan. 18, 1944 |

FOREIGN PATENTS

| 737,087 | France | Sept. 27, 1932 |
| 835,389 | France | Sept. 19, 1938 |